US012635830B2

(12) United States Patent
Melkomian

(10) Patent No.: US 12,635,830 B2
(45) Date of Patent: May 26, 2026

(54) COLLAPSIBLE GRILL

(71) Applicant: The Simple Grill Inc, Burbank, CA (US)

(72) Inventor: Alvin Melkomian, Burbank, CA (US)

(73) Assignee: The Simple Grill Inc, Burbank, CA (US)

( * ) Notice: Subject to any disclaimer, the term of this patent is extended or adjusted under 35 U.S.C. 154(b) by 394 days.

(21) Appl. No.: 18/520,355

(22) Filed: Nov. 27, 2023

(65) Prior Publication Data

US 2024/0172892 A1 May 30, 2024

Related U.S. Application Data

(60) Provisional application No. 63/385,173, filed on Nov. 28, 2022.

(51) Int. Cl.
*A47J 37/07* (2006.01)

(52) U.S. Cl.
CPC .... *A47J 37/0704* (2013.01); *A47J 2037/0777* (2013.01)

(58) Field of Classification Search
CPC ............ A47J 37/0704; A47J 2037/0777; A47J 37/0763
See application file for complete search history.

(56) References Cited

U.S. PATENT DOCUMENTS

| | | |
|---|---|---|
| 1,562,747 A | 11/1925 | Ellis |
| 1,650,529 A | 11/1927 | Montgomery |
| 1,856,025 A | 4/1932 | Carstenbrook |
| 2,061,336 A * | 11/1936 | Stuart ..................... F24B 1/205 126/25 R |
| 3,101,080 A | 8/1963 | Lorbacher |
| 3,610,225 A | 10/1971 | Schwantes |
| 3,989,028 A | 11/1976 | Berger |
| 4,126,116 A | 11/1978 | McCallum |
| D290,923 S | 7/1987 | Erickson |

(Continued)

OTHER PUBLICATIONS

Hot Life Portable Charcoal Barbecue Grill, available in Amazon. com, customer review oldest date Jul. 10, 2020, [Dec. 14, 2024], Available from the internet URL:<https://www.amazon.in/dp/B07TBDBLRG/ (Year: 2020).

(Continued)

*Primary Examiner* — Jesse S Bogue
(74) *Attorney, Agent, or Firm* — Procopio, Cory, Hargreaves & Savitch LLP; Pattric J. Rawlins

(57) ABSTRACT

A collapsible grill system that transitions between an upright configuration and a collapsed configuration includes a two-part base, a front wall, a back wall, a first side wall, a second side wall, and a plurality of legs. The front wall, the back wall, the first side wall, the second side wall are hingedly connected to each other and the front wall is hingedly connected to the first part of the base and the rear wall is hingedly connected to the second part of the base. Each leg is attached to a wall adjacent to a corresponding stopper that is attached to the same wall. In the upright configuration, each leg is configured to rotate and extend down below the two-part base and be restricted from further rotation by the stopper to position the foot of the leg for contacting the surface on which the collapsible grill system is supported.

22 Claims, 8 Drawing Sheets

(56) References Cited

U.S. PATENT DOCUMENTS

| 4,794,906 | A | * | 1/1989 | Longley, Jr. | F24C 1/16 |
| | | | | | 126/38 |
| 5,503,138 | A | | 4/1996 | Chang | |
| 5,517,903 | A | | 5/1996 | Kaufman | |
| 8,701,649 | B2 | * | 4/2014 | Kukuliyev | A47J 37/0763 |
| | | | | | 99/449 |
| 9,702,563 | B2 | * | 7/2017 | Probst | A47J 37/0772 |
| 10,327,582 | B2 | * | 6/2019 | Artig | A47J 33/00 |
| 10,426,293 | B2 | * | 10/2019 | Van Der Westhuizen | |
| | | | | | A47J 37/07 |
| D888,914 | S | | 6/2020 | Hartman | |
| 10,772,453 | B2 | | 9/2020 | Steinke, II | |
| D976,048 | S | | 1/2023 | Sullivan | |
| D980,957 | S | | 3/2023 | Hong | |
| 2005/0155496 | A1 | | 7/2005 | Lu | |
| 2008/0087176 | A1 | * | 4/2008 | Qayyeumi | A47J 37/0704 |
| | | | | | 99/450 |
| 2008/0145512 | A1 | * | 6/2008 | Paperno | A47F 5/112 |
| | | | | | 211/72 |
| 2012/0067228 | A1 | | 3/2012 | Hale | |
| 2012/0255542 | A1 | | 10/2012 | Kukuliyev | |
| 2014/0251316 | A1 | | 9/2014 | Unitas | |
| 2016/0338534 | A1 | | 11/2016 | Van Der Westhuizen | |
| 2017/0340167 | A1 | | 11/2017 | Chung | |
| 2019/0357728 | A1 | | 11/2019 | Plunk | |
| 2020/0237151 | A1 | | 7/2020 | O' Bryant | |
| 2021/0361116 | A1 | | 11/2021 | Battel | |
| 2024/0172892 | A1 | | 5/2024 | Melkomian | |

OTHER PUBLICATIONS

Ex Parte Quayle Action for U.S. Appl. No. 29/868,273, Notification Date Dec. 23, 2024, 7pgs.

* cited by examiner

800

805

ROTATE FIRST BASE
PORTION

810

ROTATE SECOND BASE
PORTION

815

ROTATE FRONT WALL,
REAR WALL, FIRST SIDE,
AND SECOND SIDE

820

ROTATE LEGS

825

SECURE IN COLLAPSED
CONFIGURATION

COLLAPSIBLE GRILL

RELATED APPLICATION

The present application claims priority to U.S. provisional patent application No. 63/385,173 filed 28 Nov. 2022, which is incorporated herein by reference in its entirety.

BACKGROUND

Field of the Invention

The present disclosure relates generally to a portable and collapsible grill.

Related Art

Grilling is a favorite outdoor activity for many people. Unfortunately, grilling requires a robust apparatus that can withstand the fire and heat that goes along with regular use of the grill. This robustness requirement makes grills difficult to move around and results in grills being largely non-portable. Some portability solutions have been provided where a grill is mounted on a rolling frame. However, this type of solution only allows for limited portability, e.g., from one location in the back yard to another location in the back yard. Accordingly, what is needed is a portable grill that overcomes these significant problems found in the conventional grills as described above.

SUMMARY

In some aspects, the techniques described herein relate to a collapsible grill system having an upright configuration and a collapsed configuration, the system including: a base including a first base portion and a second base portion, the first base portion having a first base portion upper surface and a first base portion lower surface, the second base portion having a second base portion upper surface and a second base portion lower surface; a front wall having a front wall exterior surface and a front wall interior surface the front wall hingedly attached to the first base portion and extending upward from the first base portion upper surface; a rear wall having a rear wall exterior surface and a rear wall interior surface, the rear wall hingedly attached to the second base portion and extending upward from the second base portion upper surface; a first side wall having a first side wall exterior surface and a first side wall interior surface, the first side wall hingedly attached to the front wall and hingedly attached to the rear wall, wherein the first side wall includes a lower portion extending inward from the first side wall interior surface to form a first side wall flange configured to support a portion of the first base portion and the second base portion; a second side wall having a second side wall exterior surface and a second side wall interior surface, the second side wall hingedly attached to the front wall and hingedly attached to the rear wall, wherein the second side wall includes a lower portion extending inward from the second side wall interior surface to form a second side wall flange configured to support a portion of the first base portion and the second base portion; a plurality of legs, each leg rotatably attached to one of the front wall, the rear wall, the first side wall, and the second side wall, each leg having a foot configured to engage a surface on which the collapsible grill system is supported; and a plurality of stoppers, each stopper corresponding to one of the plurality of legs and fixedly attached to a same of the front wall, the rear wall, the first side wall, and the second side wall as the corresponding leg, each stopper configured to restrict rotation of the corresponding leg to position the foot of the corresponding leg to engage the surface on which the collapsible grill system is supported; wherein, the first base portion is configured to hingedly rotate to position the first base portion upper surface to face the front wall interior surface, the second base portion is configured to hingedly rotate to position the second base portion upper surface to face the rear wall interior surface, and subsequent to hingedly rotating the first base portion and hingedly rotating the second base portion, the front wall, rear wall, first side wall, and second side wall are configured to hingedly rotate in cooperation to position the first side wall interior surface to face the first base portion lower surface, to position the second side wall interior surface to face the second base portion lower surface, and to position a portion of the first base portion lower surface to face the second base portion lower surface to arrange the collapsible grill system in a collapsed configuration.

In some aspects, the techniques described herein relate to a system, wherein each of the plurality of legs has a length and a width and each of the plurality of legs is configured to rotate to a position where an edge along the length of the respective leg is substantially parallel to a lower edge of the one of the front wall, the rear wall, the first side wall, and the second side wall to which the leg is attached.

In some aspects, the techniques described herein relate to a system, wherein a first portion of the first base portion lower surface is configured to engage a portion of the upper surface of the first side wall flange and a portion of the upper surface of the second side wall flange in an upright configuration.

In some aspects, the techniques described herein relate to a system, wherein a first portion of the second base portion lower surface is configured to engage a portion of the upper surface of the first side wall flange and a portion of the upper surface of the second side wall flange in the upright configuration.

In some aspects, the techniques described herein relate to a system, wherein the front wall includes a front wall lower edge adjacent to the hinged attachment of the front wall to the first base portion and a front wall upper edge opposite the front wall lower edge, wherein the front wall upper edge includes a plurality of cutouts configured to support a first portion of a grate.

In some aspects, the techniques described herein relate to a system, wherein the rear wall includes a rear wall lower edge adjacent to the hinged attachment of the rear wall to the second base portion and a rear wall upper edge opposite the rear wall lower edge, wherein the rear wall upper edge includes a plurality of cutouts configured to support a second portion of the grate.

In some aspects, the techniques described herein relate to a system, further including a plurality of air vent holes positioned in at least one of the front wall, the rear wall, the first side wall and the second side wall.

In some aspects, the techniques described herein relate to a system, further including an equal plurality of air vent holes positioned in the front wall and the rear wall.

In some aspects, the techniques described herein relate to a system, wherein a number of air vent holes positioned in front wall is at least seven and a number of air vent holes positioned in rear wall is at least seven.

In some aspects, the techniques described herein relate to a system, further including a first handle attached to the exterior surface of the first side wall and a second handle attached to the exterior surface of the second side wall.

In some aspects, the techniques described herein relate to a method for transitioning a collapsible grill from an upright configuration to a collapsed configuration, the collapsible grill including a first base portion, a second base portion, a front wall, a rear wall, a first side wall, a second side wall, and a plurality of legs rotatably attached to at least two of the front wall, the rear wall, the first side wall, and the second side wall, the method including: rotating the first base portion about a first horizontal hinge connecting the first base portion to the front wall to position an upper surface of the first base portion to face an interior surface of the front wall; rotating the second base portion about a second horizontal hinge connecting the second base portion to the rear wall to position an upper surface of the second base portion to face an interior surface of the rear wall; and rotating the front wall, rear wall, first side wall, and second side wall about third vertical hinges connecting the first side wall to the front wall and the rear wall and connecting the second side wall to the front wall and the rear wall to position an interior surface of the first side wall to face a lower surface of the first base portion, to position an interior surface of the second side wall to face a lower surface of the second base portion, and to position a portion of the lower surface of the first base portion to face the lower surface of the second base portion to arrange the collapsible grill in a collapsed configuration.

In some aspects, the techniques described herein relate to a method, further including rotating each of the plurality of legs to position an edge corresponding to a length of the respective leg to be substantially parallel to a lower edge of at least one of the front wall, the rear wall, the first side wall, and the second side wall.

In some aspects, the techniques described herein relate to a collapsible grill system including: a base including a first base portion and a second base portion, the first base portion having a first base portion upper surface and a first base portion lower surface, the second base portion having a second base portion upper surface and a second base portion lower surface; a front wall having a front wall exterior surface and a front wall interior surface the front wall hingedly attached to the first base portion and extending upward from the first base portion upper surface; a rear wall having a rear wall exterior surface and a rear wall interior surface, the rear wall hingedly attached to the second base portion and extending upward from the second base portion upper surface; a right side wall having a right side wall exterior surface and a right side wall interior surface, the right side wall hingedly attached to the front wall and hingedly attached to the rear wall, wherein the right side wall includes a lower portion extending inward from the right side wall interior surface to form a right side wall flange configured to support a portion of the first base portion and the second base portion; a left side wall having a left side wall exterior surface and a left side wall interior surface, the left side wall hingedly attached to the front wall and hingedly attached to the rear wall, wherein the left side wall includes a lower portion extending inward from the left side wall interior surface to form a left side wall flange configured to support a portion of the first base portion and the second base portion; a plurality of legs rotatably attached to the front wall and the rear wall, each leg having a foot configured to engage a surface on which the collapsible grill system is supported; and a plurality of stoppers fixedly attached to the front wall and the rear wall, wherein each of the plurality of legs has a corresponding stopper configured to restrict rotation of the leg to arrange the collapsible grill system in an upright configuration; wherein, the first base portion is configured to hingedly rotate to position the first base portion upper surface to face the front wall interior surface, the second base portion is configured to hingedly rotate to position the second base portion upper surface to face the rear wall interior surface, and the front wall, rear wall, right side wall, and left side wall are configured to hingedly rotate in cooperation to position the right side wall interior surface to face the first base portion lower surface, to position the left side wall interior surface to face the second base portion lower surface, and to position a portion of the first base portion lower surface to face the second base portion lower surface to arrange the collapsible grill system in a collapsed configuration.

In some aspects, the techniques described herein relate to a system, wherein each of the plurality of legs has a length and a width and each of the plurality of legs is configured to rotate to a position where an edge along the length of the respective leg is substantially parallel to a lower edge of the respective wall to which the leg is attached.

In some aspects, the techniques described herein relate to a system, wherein a first portion of the first base portion lower surface is configured to engage a portion of the upper surface of the right side wall flange and a portion of the upper surface of the left side wall flange in an upright configuration.

In some aspects, the techniques described herein relate to a system, wherein a first portion of the second base portion lower surface is configured to engage a portion of the upper surface of the right side wall flange and a portion of the upper surface of the left side wall flange in the upright configuration.

In some aspects, the techniques described herein relate to a system, wherein the front wall includes a front wall lower edge adjacent to the hinged attachment of the front wall to the first base portion and a front wall upper edge opposite the front wall lower edge, wherein the front wall upper edge includes a first plurality of cutouts configured to support a first portion of a grate.

In some aspects, the techniques described herein relate to a system, wherein the rear wall includes a rear wall lower edge adjacent to the hinged attachment of the rear wall to the second base portion and a rear wall upper edge opposite the rear wall lower edge, wherein the rear wall upper edge includes a second plurality of cutouts configured to support a second portion of the grate.

In some aspects, the techniques described herein relate to a system, further including a plurality of air vent holes positioned in at least one of the front wall, the rear wall, the right side wall and the left side wall.

In some aspects, the techniques described herein relate to a system, further including an equal plurality of air vent holes positioned in the front wall and the rear wall.

In some aspects, the techniques described herein relate to a system, wherein a number of air vent holes positioned in the front wall is at least seven and a number of air vent holes positioned in the rear wall is at least seven.

In some aspects, the techniques described herein relate to a system, further including a first handle attached to the exterior surface of the right side wall and a second handle attached to the exterior surface of the left side wall.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Disclosed herein are embodiments of a collapsible grill system that provide a grill system able to transition between a collapsed configuration and an upright configuration. The collapsed configuration is advantageously ideal for storage and transportation and the upright configuration is advantageously ideal for cooking and grilling.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
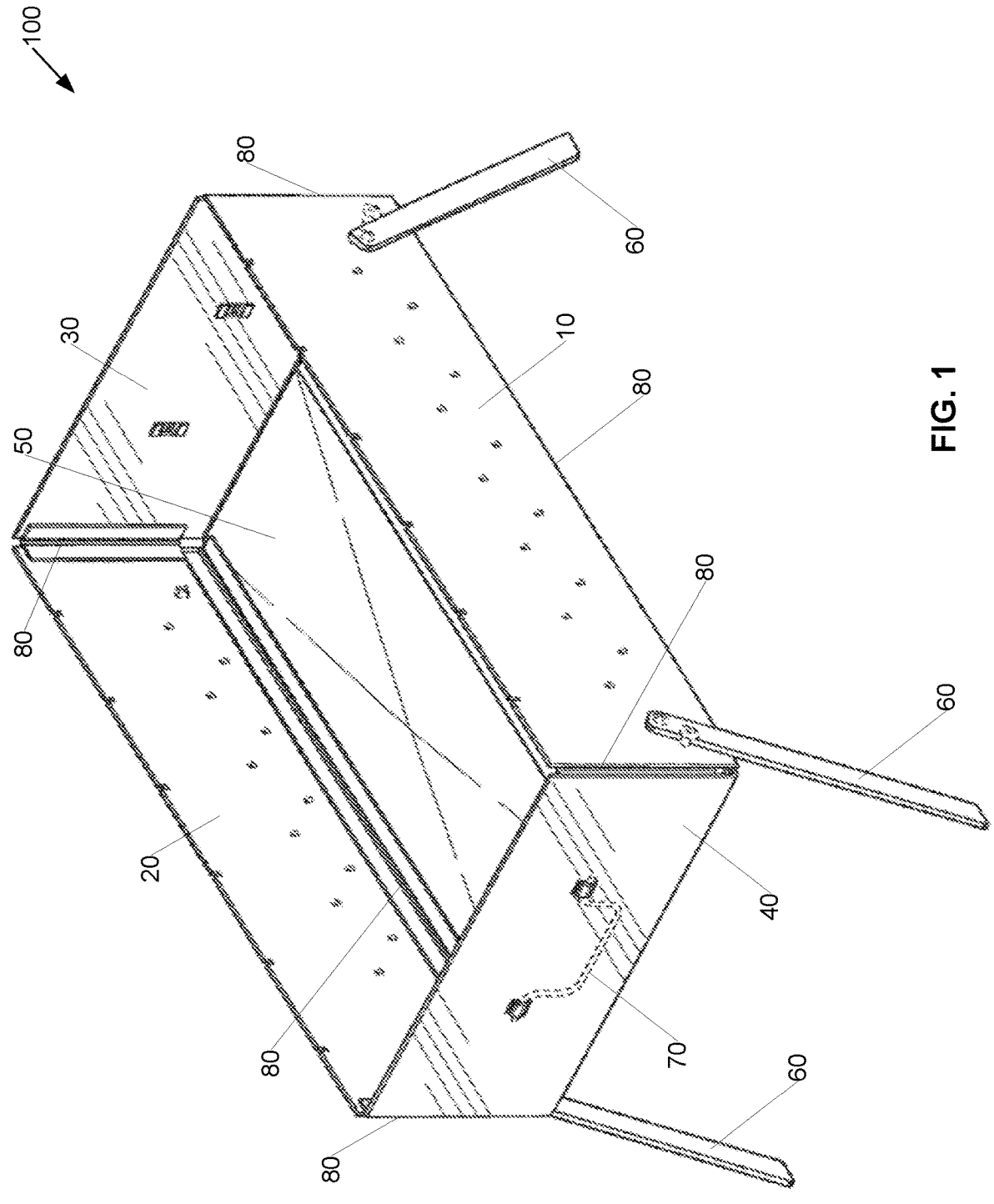
FIG. 1 is a perspective view diagram illustrating an example collapsible grill system in an upright configuration according to an embodiment.

FIG. 1 is a perspective view diagram illustrating an example collapsible grill system 100 in an upright configuration according to an embodiment. In the illustrated embodiment, the collapsible grill system 100 includes a front wall 10, a rear wall 20, a first side wall 30 (also referred to herein as "right side wall"), a second side wall 40 (also referred to herein as "left side wall"), a base 50, a plurality of legs 60, a plurality of handles 70, and a plurality of hinges 80.

The front wall 10 and rear wall 20 are hingedly attached to the base 50. Each of the front wall 10 and the rear wall 20 has an exterior surface and an interior surface defined by an upper edge, a lower edge, and two side edges. In one aspect, the base 50 is divided into two portions (first base portion 510 and second base portion 520) and each portion has an upper surface and a lower surface defined by an exterior edge, an interior edge, a first side edge (also referred to herein as "right side edge"), and a second side edge (also referred to herein as "right side edge").

A first portion of a first horizontal hinge 80 is attached adjacent to the lower edge of the front wall 10 and a second portion of the first horizontal hinge 80 is attached adjacent to the exterior edge of the first base portion 510. Similarly, a first portion of a second horizontal hinge 80 is attached adjacent to the lower edge of the rear wall 20 and a second portion of the second horizontal hinge 80 is attached adjacent to the exterior edge of the second base portion 520.

The first side wall 30 and second side wall 40 are hingedly attached to the front wall 10 and the rear wall 20. In the illustrated embodiment, the first side wall 30 and second side wall 40 are not attached to the base 50. Each of the first side wall 30 and second side wall 40 has an exterior surface and an interior surface defined by an upper edge and a lower portion and two side edges. In an upright configuration, the interior surface of the first side wall 30 faces the interior surface of the second side wall 40. The lower portion of the first side wall 30 comprises a flange portion that extends away from the interior surface of the first side wall 30 and toward the second side wall 40. Similarly, the lower portion of the second side wall 40 comprises a flange portion that extends away from the interior surface of the second side wall 40 and toward the first side wall 30. The upper surface of each flange portion is configured to engage and support a portion of the first base portion 510 and the second base portion 520.

A first portion of a first vertical hinge 80 is attached adjacent to the first side edge of the first side wall 30 and a second portion of the first vertical hinge 80 is attached adjacent to the first side edge of the front wall 10. Similarly, a first portion of a second vertical hinge 80 is attached adjacent to the second side edge of the first side wall 30 and a second portion of the second vertical hinge 80 is attached adjacent to the second side edge of the rear wall 20. Additionally, a first portion of a third vertical hinge 80 is attached adjacent to the first side edge of the second side wall 40 and a second portion of the third vertical hinge 80 is attached adjacent to the second side edge of the front wall 10. Similarly, a first portion of a fourth vertical hinge 80 is attached adjacent to the second side edge of the second side wall 40 and a second portion of the fourth vertical hinge 80 is attached adjacent to the second side edge of the rear wall 20.

In one aspect, all of the front wall 10, rear wall 20, first side wall 30, and second side wall 40 are hingedly attached together and only the front wall 10 and the rear wall 20 are hingedly attached to the base 50 (which comprises a first base portion 510 and a separate second base portion 520). In an upright configuration, the first base portion 510 and the separate second base portion 520 are substantially horizontal to a surface upon which the collapsible grill system 100 is supported and the first and second side edge portions of the first base portion 510 and the separate second base portion 520 are supported by the flange portions of the first side wall 30 and second side wall 40.

In one aspect, the collapsible grill system 100 has four legs 60 and each leg 60 has a foot portion at a first end and is rotatably attached to a wall of the collapsible grill system 100 at a second end. Each leg 60 is configured to rotate between and upright configuration position and a collapsed configuration position. In the upright configuration position, the foot portion of the first end is configured to engage the surface upon which the collapsible grill system 100 is supported. In the collapsed position, the leg 60 is configured to rotate about an axis defined by the rotatable attachment such that the longest length of the leg 60 is substantially parallel to the lower edge of the front wall 10 or the rear wall 20.

In one aspect, the collapsible grill system 100 may include one or more handles 70. For example, the collapsible grill system 100 may include a first handle 70 attached to the exterior surface of the first side wall 30 and a second handle 70 attached to the exterior surface of the second side wall 40. Alternatively, the collapsible grill system 100 may include a first handle 70 attached to the exterior surface of the front wall 10 and a second handle 70 attached to the exterior surface of the rear wall 20.

In one aspect, the collapsible grill system 100 may also include a plurality of air vent holes 210 in one or more of the front wall 10, rear wall 20, first side wall 30, and second side wall 40. The air vent holes 210 are configured to increase air flow in the collapsible grill system 100 for more efficient and hotter combustion of fuel.

Figure 2:
FIG. 2 is a front view diagram illustrating an example collapsible grill system in an upright configuration according to an embodiment.

FIG. 2 is a front view diagram illustrating an example collapsible grill system 200 in an upright configuration according to an embodiment. In the illustrated embodiment, the front wall 10 is shown with the first side wall 30 on the right and the second side wall 40 on the left. A plurality of air vent holes 210 are present in the front wall 10. In the upper edge of the front wall 10 are a plurality of cutouts 220. The cutouts 220 in the front wall 10 are configured to receive a first portion of a grate 310. A similar set of cutouts 220 are present in the upper edge of the rear wall 20 and configured to receive a second portion of the grate 310 such that at least the front wall 10 and rear wall 20 support the grate 310 and provide the collapsible grill system 200 with a grated cooking surface.

In an alterative aspect, the cutouts 220 are configured in pairs with a first cutout 220 of a pair in the front wall 10 and a second cutout 220 of the pair in the rear wall 20. Advantageously, the width and depth of the first cutout 220 in the pair is configured to receive a first portion of a skewer and the width and depth of the second cutout 220 in the pair is configured to receive a second portion of the skewer. In this fashion, the collapsible grill system 200 can be used to position items on skewers over the heat provided by the combusting fuel source.

In one aspect, the collapsible grill system 200 includes a plurality of legs 60. Each leg 60 is attached to a wall with a rotatable fastener 230. The rotatable fastener 230 secures the leg to the respective wall of the collapsible grill system 200 and permits the leg 60 to rotate about an axis defined by the rotatable fastener 230. Advantageously the collapsible grill system 200 also includes a plurality of stoppers 240. Each stopper 240 corresponds to one of the plurality of legs 60 and is attached to the same wall as the rotatable fastener 230 of the corresponding leg 60. For example, a first leg 60 has a first rotatable fastener 230 and a first stopper 240. The first stopper 240 is attached to the same wall as the first rotatable fastener 230 and is positioned adjacent to the first rotatable fastener 230. Accordingly, to transition into the upright configuration, when the first leg 60 is rotated in a first direction about the axis defined by the first rotatable fastener 230, the first stopper 240 restricts rotation of the first leg 60 in the first direction to position the foot of the first leg 60 such that the foot of the first leg 60 engages the surface on which the collapsible grill system 200 is supported. The first stopper 240 may also be secured to the wall of the collapsible grill system 200 at a position that restricts rotation of the first leg 60 in a second direction (opposite the first direction) about the axis defined by the first rotatable fastener 230 in order to position the first leg 60 for storage and/or transport in the collapsed configuration.

In one aspect, the air vent holes 210 may be configured to receive a removable stopper 240 and the air vent holes 210 may be positioned such that when the first leg 60 is rotated into the collapsed configuration position, one or more removable stoppers 240 may be inserted into one or more of the air vent holes 210 to prevent the first leg 60 from rotation in both the first direction and the second direction.

Figure 3:
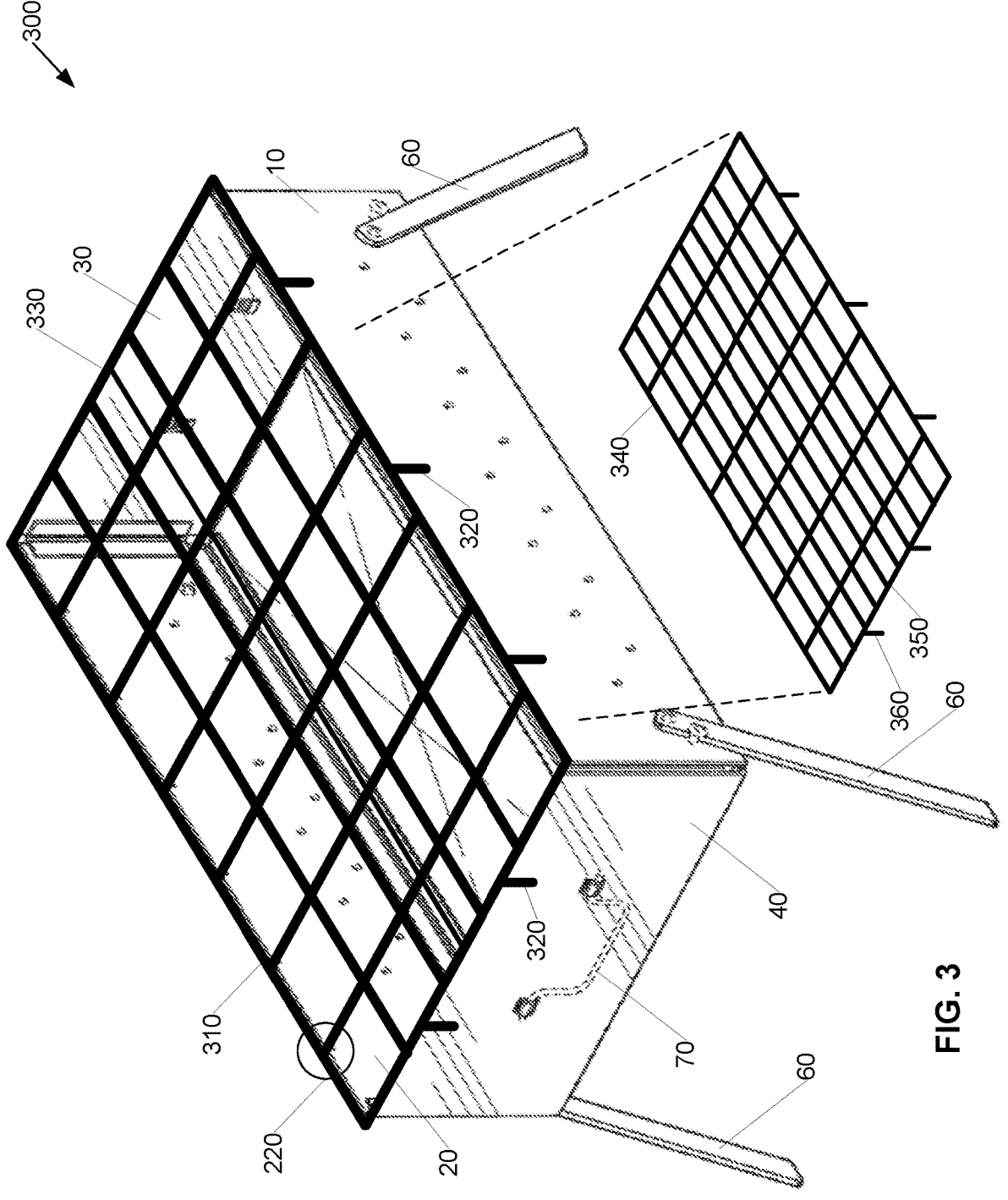
FIG. 3 is a perspective view diagram illustrating an example collapsible grill system in an upright configuration according to an embodiment.

FIG. 3 is a perspective view diagram illustrating an example collapsible grill system 300 in an upright configuration according to an embodiment. In the illustrated embodiment, a first portion of the grate 310 is positioned in the cutouts 220 on the top edge of the front wall 100 and a second portion of the grate 310 is positioned in the cutouts 220 on the top edge of the rear wall 20. Advantageously, the grate 310 is supported by at least the front wall 10 and the rear wall 20 and the grate 30 may also engage the first side wall 30 and the second side wall 40 for additional support.

In an alternative aspect, no portion of the grate 310 is positioned in the cutouts 220. For example, the width or girth of an individual crossing member of the grate 310 may be too large to fit into the width of the cutout 220 or the positioning of the various crossing members of the grate 310 may not align with any of the cutouts 220. In this aspect, the grate 310 comprises a plurality of extensions 320 that extend downward from the perimeter of the grate 310. For example, there may be a plurality of extensions 320 that extend down from the perimeter on each of the four sides of the grate 310. Advantageously, the combination of the extensions 320 on each of the four sides of the grate 310 secure the grate 310 over the collapsible grill system 300 in the horizontal plane that is parallel to the surface upon which the collapsible grill system 300 is supported.

In one aspect, the front wall 10, rear wall 20, first side wall 30, second side wall 40, first base portion 510, and second base portion 520 collectively form a rectangular box shape that defines a rectangular cavity into which fuel such as charcoal or wood may be placed when cooking with the collapsible grill system 300. Advantageously, the first base portion 510 and the second base portion 520, which are supported by the first side wall flange 530 and the second side wall flange 540, may in turn support a lower grate configured to elevate the fuel inside the collapsible grill system 300. The lower grate advantageously permits air entering through the plurality of air vents 210 into the rectangular cavity to circulate beneath and around the fuel to allow the fuel to light more efficiently and burn hotter. The lower grate also advantageously protects the first base portion 510 and the second base portion 520 from direct contact with the fuel during combustion of the fuel.

In one aspect, the grate 310 may comprise two portions that are hingedly connected to each other to form the grate 310. Advantageously, one or more hinges 330 that connect the first portion and the second portion of the grate 310 allow the grate 310 to fold into a collapsed configuration having a length and width similar to the front wall 10. This allows the collapsed grate 310 to be stored and/or transported in a fastened container along with the collapsible grill system 300.

Additionally, the collapsible grill system 300 may include a lower grate 340 that also comprises two portions that are hingedly connected to each other to form the lower grate 340. Advantageously, one or more hinges 350 that connect the first portion and the second portion of the lower grate 340 allow the lower grate 340 to fold into a collapsed configuration having a length and width similar to the front wall 10. This allows the collapsed lower grate 340 to be stored and/or transported in a fastened container along with the collapsible grill system 300. In one aspect, the lower grate 340 includes a plurality of feet 360 that are configured to engage the base 50 and elevate the grate 340 above the fuel (e.g., charcoal) being used in the collapsible grill system 300.

Figure 4:
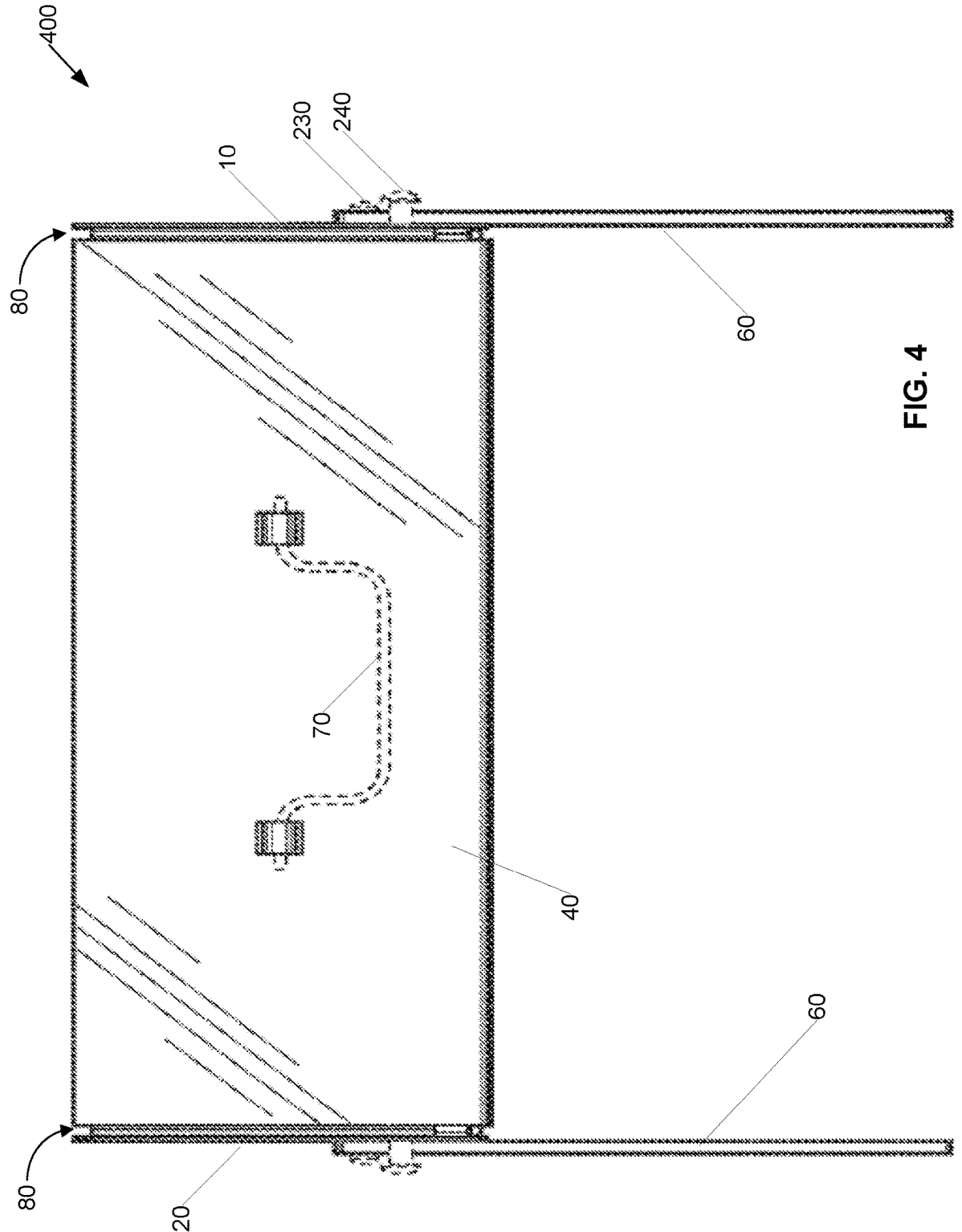
FIG. 4 is a side view diagram illustrating an example collapsible grill system in an upright configuration according to an embodiment.

FIG. 4 is a side view diagram illustrating an example collapsible grill system 400 in an upright configuration according to an embodiment. In the illustrated embodiment, a first side of the collapsible grill system 400 is shown with a handle 70 attached to the exterior surface of the second side wall 40. The vertical hinges 80 are positioned to hingedly attach the second side wall 40 to the front wall 10 and the rear wall 20. Legs 60 are shown extending downward such that the foot at the end of each leg 60 is positioned to engage the surface upon which the collapsible grill system 400 is supported. Advantageously, the feet of each leg 60 are substantially parallel. A first leg 60 is attached to the front wall 10 by way of a rotatable fastener 230 and a corresponding stopper 240 is also attached to the front wall 10 adjacent to the rotatable fastener 230. In the side view, it can be seen that the stopper 240 extends outward from the front wall 10 further than the width of the first leg 60. As previously discussed, the stopper 240 restricts rotation of the first leg 60 about the axis defined by the first rotatable fastener 230 in order to position the foot of the first leg 60 to engage the surface upon which the collapsible grill system 400 is supported when in the upright configuration.

Figure 5:
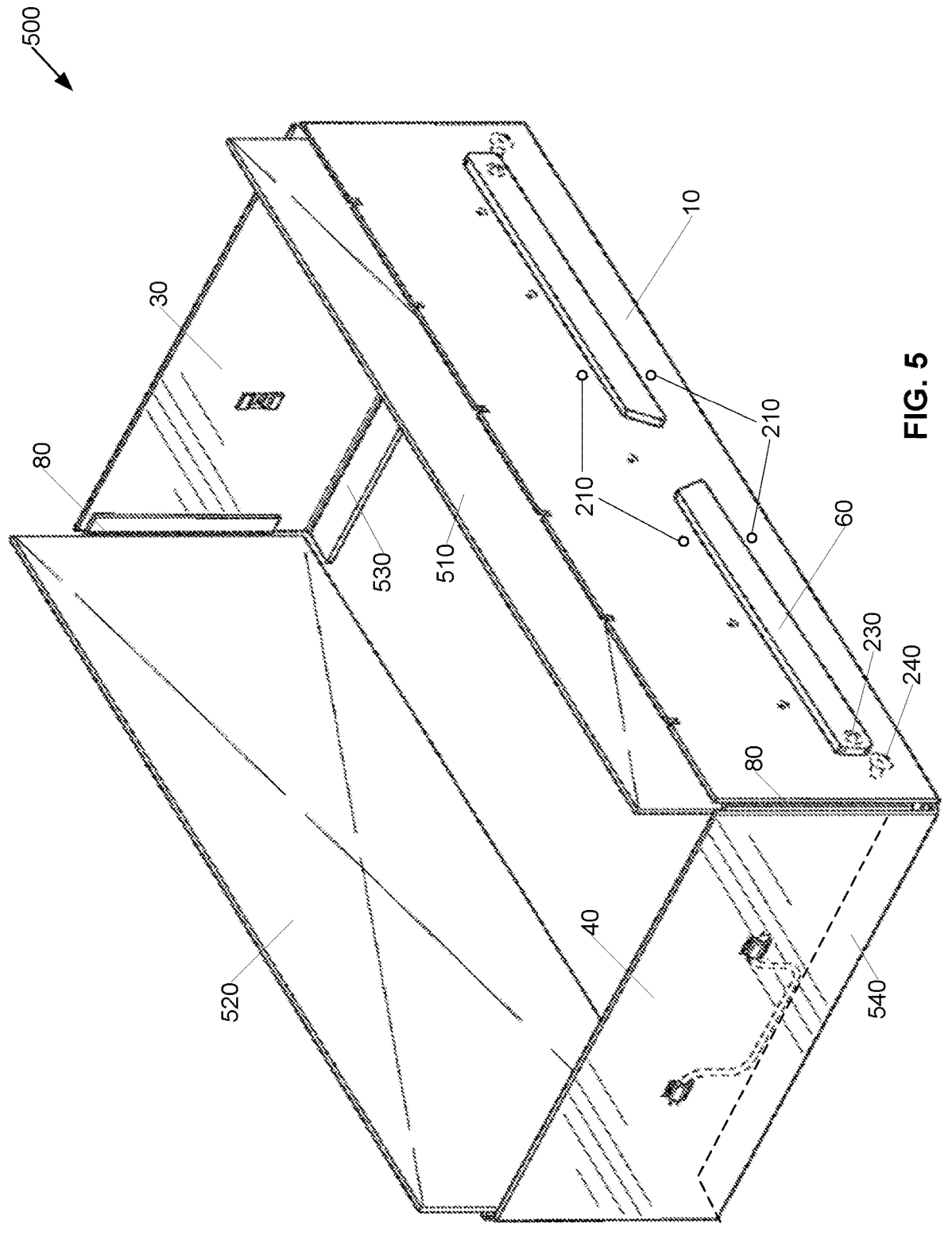
FIG. 5 is a perspective view diagram illustrating an example collapsible grill system in a partially collapsed configuration according to an embodiment.

FIG. 5 is a perspective view diagram illustrating an example collapsible grill system 500 in a partially collapsed configuration according to an embodiment. In the illustrated embodiment, the legs 60 are rotated into their collapsed configuration. For example, a first leg 60 has been rotated about the axis defined by the first rotatable fastener 230 that attaches the leg 60 the front wall 10 into a position where an edge along the length of the leg 60 is substantially parallel to a lower edge of the front wall 10, to which the first leg 60 is attached.

Advantageously, in one aspect two or more air vent holes 210 are positioned to be on opposite sides of the first leg 60 when the first leg 60 is in the collapsed position. This allows the air vent holes 210 to be plugged with a removable stopper, for example, a stopper made out of a semi-flexible rubber or plastic material. In combination, the removable stoppers on opposite sides of the first leg 60 prevent the first leg 60 from moving about the axis defined by the first rotatable fastener 230 in either the first direction or the second direction.

Also shown in the illustrated embodiment are the first base portion 510 and the second base portion 520 after they have been rotated to position the upper surface of the first base portion 510 to face the interior surface of the front wall 10 and to position the upper surface of the second base portion 520 to face the interior surface of the rear wall 20. When the first base portion 510 and the second base portion 520 are rotated into their collapsed configuration as shown, the first side wall flange 530 and second side wall flange 540 are visible in a plan view. Advantageously, the first side wall flange 530 and second side wall flange 540 support the first base portion 510 and the second base portion 520 in the upright configuration and position the first base portion 510 and the second base portion 520 such that their interior edges abut each other in the upright configuration. This abutted positioning increases lateral stability and overall stability of the collapsible grill system 500 in the upright configuration.

Figure 6:
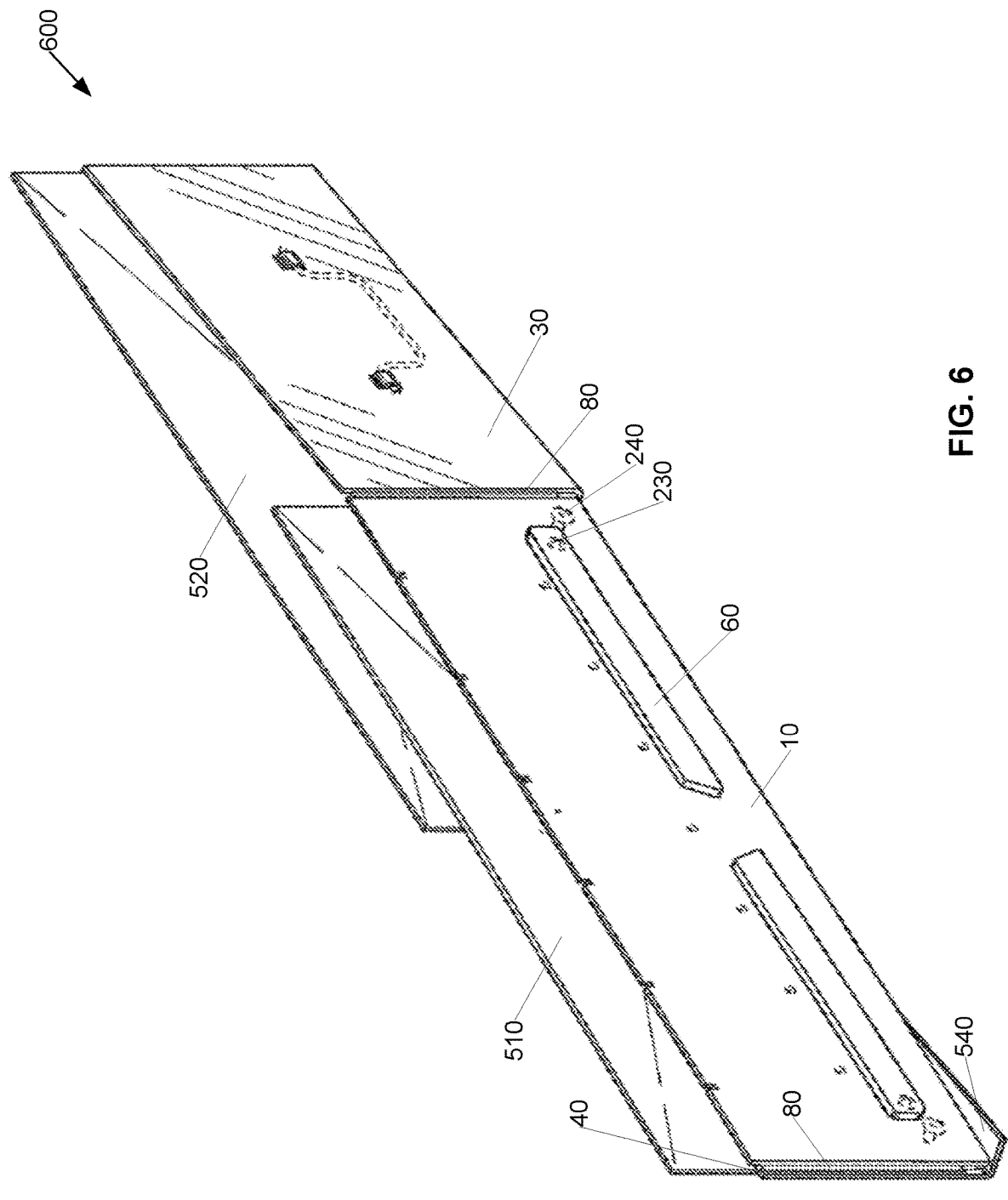
FIG. 6 a perspective view diagram illustrating an example collapsible grill system in a collapsed configuration according to an embodiment.

FIG. 6 a perspective view diagram illustrating an example collapsible grill system 600 in a collapsed configuration according to an embodiment. In the illustrated embodiment, the first base portion 510 and the second base portion 520 are first rotated into their collapsed position as previously discussed with respect to FIG. 5. The legs 60 can be rotated into their collapsed position before or after the base and walls and in the illustrated embodiment, the legs 60 have also been rotated into their collapsed position.

After rotating the first base portion 510 and the second base portion 520 into their collapsed positions, the upper surface of the first base portion 510 faces the interior surface of the front wall 10 and the upper surface of the second base portion 520 faces the interior surface of the rear wall 20.

Next, the front wall 10, rear wall 20, first side wall 30, and second side wall 40 are cooperatively rotated about the vertical hinges 80 that connect the first side wall 30 to the front wall 10 and the rear wall 20 and also connect the second side wall 40 to the front wall 10 and the rear wall 20. This cooperative rotation happens simultaneously and positions an interior surface of the first side wall 30 to face the lower surface of the first base portion 510. The cooperative rotation also positions an interior surface of the second side wall 40 to face the lower surface of the second base portion 520 and positions a portion of the lower surface of the first base portion 510 to face the lower surface of the second base portion 520.

Accordingly, when the collapsible grill system 600 is in the collapsed configuration as shown in the illustrated embodiment, on an end of the collapsible grill system 600 where the second side wall 40 is positioned, the first base portion 510 is sandwiched between the front wall 10 and the second side wall 40 as shown. Similarly, on an end of the collapsible grill system 600 where the first side wall 30 is positioned, the second base portion 520 is sandwiched between the rear wall 20 and the first side wall 30.

Figures 7A, 7B:
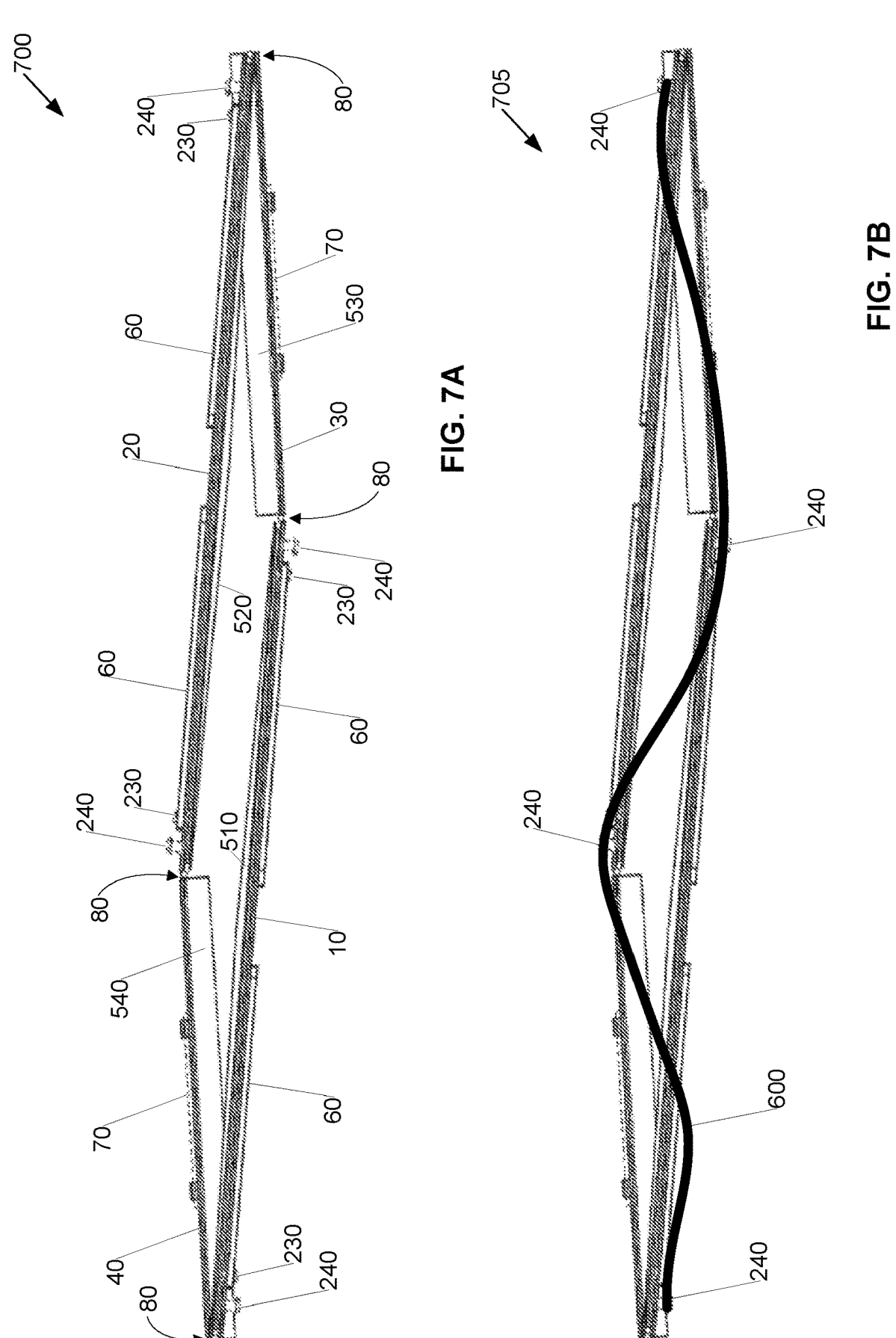
FIG. 7A is a top view diagram illustrating an example collapsible grill system in a collapsed configuration according to an embodiment.
FIG. 7B is a top view diagram illustrating an example collapsible grill system in a collapsed configuration according to an embodiment.

FIG. 7A is a top view diagram illustrating an example collapsible grill system 700 in a collapsed configuration according to an embodiment. As shown in the illustrated embodiment, the collapsible grill system 700 is not fully collapsed so that the various portions of the collapsible grill system 700 can be more easily explained. In the collapsed configuration, the collapsible grill system 700 has a substantially rhomboid shape in a plan view. The inner surface of the front wall 10 faces the upper surface of the first base portion 510 and the inner surface of the rear wall 20 faces the upper surface of the second base portion 520. A first portion of the lower surface of the first base portion 510 faces the interior surface of the second side wall and a second portion of the lower surface of the first base portion 510 faces a first portion of the lower surface of the second base portion 520 and a second portion of the lower surface of the second base portion 520 faces the interior surface of the first side wall 30.

In the illustrated top view of the collapsible grill system 700, on the end of the collapsible grill system 700 where the second side wall 40 is positioned, the first base portion 510 is positioned between the front wall 10 and the second side wall 40 as shown. Similarly, on the opposite end of the collapsible grill system 700 where the first side wall 30 is positioned, the second base portion 520 is positioned between the rear wall 20 and the first side wall 30.

FIG. 7B is a top view diagram illustrating an example collapsible grill system 705 in a collapsed configuration according to an embodiment. Advantageously, in the collapsed configuration, the plurality of stoppers 240 extend out from the respective front wall 10 and rear wall 20 that they are secured to and in the collapsed configuration the plurality of stoppers 240 are configured to operate as anchors for a flexible tether 600 made of a flexible material such as rubber or nylon. In one aspect, the collapsible grill system 700 may be secured in the collapsed configuration, for example, by attaching a first end of the tether 600 to a first stopper 240 that is attached to the front wall 10 located near the end of the collapsible grill system 700 where the second wall 40 is positioned. Once attached to the first stopper, the tether 600 is wrapped over the front wall 10, first base portion 510, and second side wall 40 and attached to a second stopper 240 attached to the rear wall 20 near the second side wall 40. From there, the tether 600 is wrapped over the rear wall 20, the second base portion 520, the first base portion 510, and the front wall 10 and attached to a third stopper 240 attached to the front wall 10 near the first side wall 30. Then the tether 600 is wrapped over the first side wall 10 and the second base portion 520 and the rear wall 20 and a second end of the tether 600 is attached to a fourth stopper 240 located near the connection between the rear wall 20 and the first side wall 30.

In an alternative aspect, the first end of the tether 600 may be attached to the second stopper 240 attached to the rear wall 20 near the connection with the second side wall 40 and wrapped over the rear wall 20, the second base portion 520, the first base portion 510, and the front wall 10 and attached to the third stopper 240 attached to the front wall 10 near the connection with the first side wall 30.

Advantageously, use of the tether 600 may prevent the collapsible grill system 705 from relaxing into a partially collapsed configuration.

Figure 8:
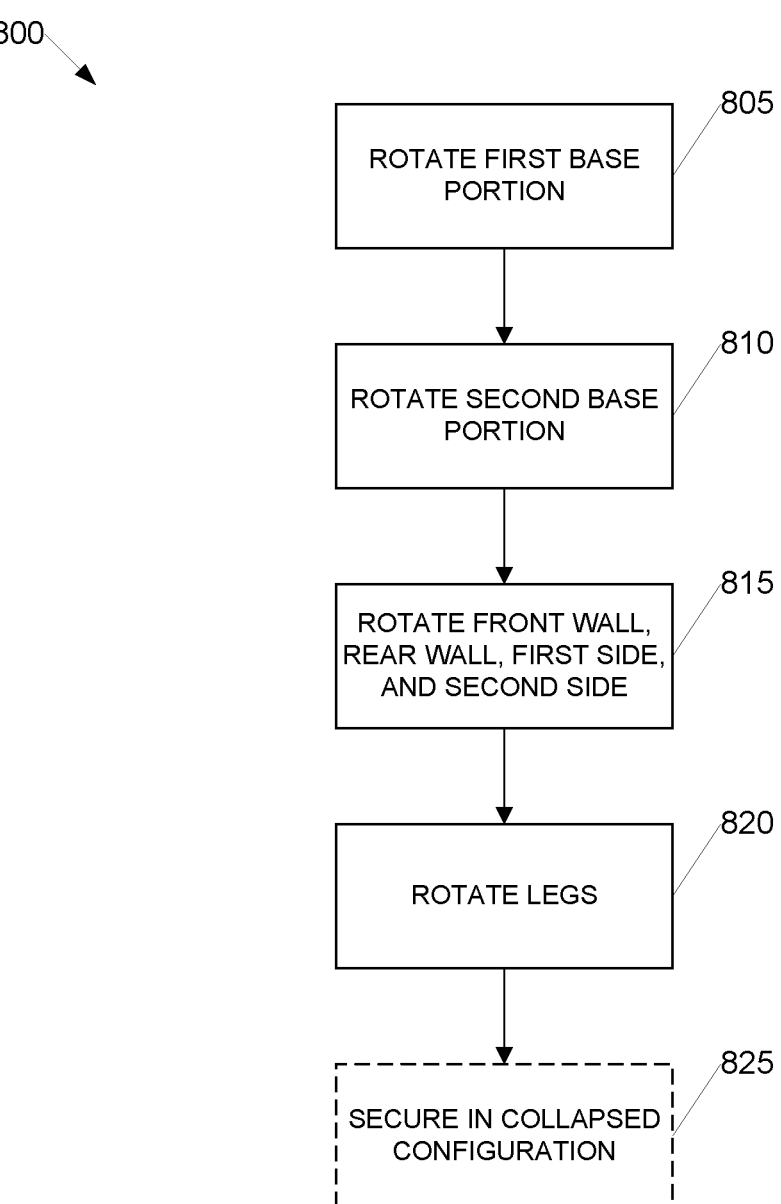
FIG. 8 is a flow diagram illustrating an example process for transitioning a collapsible grill system from an upright configuration to a collapsed configuration according to an embodiment.

FIG. 8 is a flow diagram illustrating an example process 800 for transitioning a collapsible grill system from an upright configuration to a collapsed configuration according to an embodiment. In one aspect, the process of FIG. 8 may be carried out in connection with the system described with respect to FIGS. 1-7B.

Initially, at 805, the first base portion is rotated about a first horizontal hinge connecting the first base portion to the front wall to position an upper surface of the first base portion adjacent to and facing an interior surface of the front wall.

Next, at 810, the second base portion is rotated about a second horizontal hinge connecting the second base portion to the rear wall to position an upper surface of the second base portion adjacent to and facing an interior surface of the rear wall.

Next, at 815, the front wall, rear wall, first side wall, and second side wall are cooperatively rotated about a plurality of vertical hinges connecting the first side wall to the front wall and the rear wall and connecting the second side wall to the front wall and the rear wall. This cooperative rotation positions an interior surface of the first side wall adjacent to and facing a lower surface of the first base portion, positions an interior surface of the second side wall adjacent to and facing a lower surface of the second base portion, and positions a portion of the lower surface of the first base portion adjacent to and facing the lower surface of the second base portion. This cooperative rotation in combination with rotations of the first base portion and the second base portion substantially arrange the collapsible system into the collapsed configuration.

Next, at 820, each of the plurality of legs are rotated to be substantially parallel to a lower edge of at least one of the front wall, the rear wall, the first side wall, and the second side wall.

Finally, at 825, the collapsible grill system may optionally be secured in the collapsed configuration. The collapsible grill system may be secured in the collapsed configuration by inserting the collapsible grill system into a fastened container (e.g., a zippered carrying case). The collapsible grill system may be secured in the collapsed configuration by securing a tether to two or more of the stoppers in a crossing lace fashion to prevent the collapsible grill system from relaxing into a partially collapsed configuration.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A collapsible grill system having an upright configuration and a collapsed configuration, the system comprising:
   a base comprising a first base portion and a second base portion, the first base portion having a first base portion upper surface and a first base portion lower surface, the second base portion having a second base portion upper surface and a second base portion lower surface;
   a front wall having a front wall exterior surface and a front wall interior surface the front wall hingedly attached to the first base portion and extending upward from the first base portion upper surface;
   a rear wall having a rear wall exterior surface and a rear wall interior surface, the rear wall hingedly attached to the second base portion and extending upward from the second base portion upper surface;
   a first side wall having a first side wall exterior surface and a first side wall interior surface, the first side wall hingedly attached to the front wall and hingedly attached to the rear wall, wherein the first side wall comprises a lower portion extending inward from the first side wall interior surface to form a first side wall flange configured to support a portion of the first base portion and the second base portion;
   a second side wall having a second side wall exterior surface and a second side wall interior surface, the second side wall hingedly attached to the front wall and hingedly attached to the rear wall, wherein the second side wall comprises a lower portion extending inward from the second side wall interior surface to form a second side wall flange configured to support a portion of the first base portion and the second base portion;
   a plurality of legs, each leg rotatably attached to one of the front wall, the rear wall, the first side wall, and the second side wall, each leg having a foot configured to engage a surface on which the collapsible grill system is supported; and
   a plurality of stoppers, each stopper corresponding to one of the plurality of legs and fixedly attached to a same of the front wall, the rear wall, the first side wall, and the second side wall as the corresponding leg, each stopper configured to restrict rotation of the corresponding leg to position the foot of the corresponding leg to engage the surface on which the collapsible grill system is supported;

wherein, the first base portion is configured to hingedly rotate to position the first base portion upper surface to face the front wall interior surface, the second base portion is configured to hingedly rotate to position the second base portion upper surface to face the rear wall interior surface, and subsequent to hingedly rotating the first base portion and hingedly rotating the second base portion, the front wall, rear wall, first side wall, and second side wall are configured to hingedly rotate in cooperation to position the first side wall interior surface to face the first base portion lower surface, to position the second side wall interior surface to face the second base portion lower surface, and to position a portion of the first base portion lower surface to face the second base portion lower surface to arrange the collapsible grill system in a collapsed configuration.

2. The system of claim 1, wherein each of the plurality of legs has a length and a width and each of the plurality of legs is configured to rotate to a position where an edge along the length of the respective leg is substantially parallel to a lower edge of the one of the front wall, the rear wall, the first side wall, and the second side wall to which the leg is attached.

3. The system of claim 1, wherein a first portion of the first base portion lower surface is configured to engage a portion of the upper surface of the first side wall flange and a portion of the upper surface of the second side wall flange in an upright configuration.

4. The system of claim 3, wherein a first portion of the second base portion lower surface is configured to engage a portion of the upper surface of the first side wall flange and a portion of the upper surface of the second side wall flange in the upright configuration.

5. The system of claim 1, wherein the front wall comprises a front wall lower edge adjacent to the hinged attachment of the front wall to the first base portion and a front wall upper edge opposite the front wall lower edge, wherein the front wall upper edge comprises a plurality of cutouts configured to support a first portion of a grate.

6. The system of claim 5, wherein the rear wall comprises a rear wall lower edge adjacent to the hinged attachment of the rear wall to the second base portion and a rear wall upper edge opposite the rear wall lower edge, wherein the rear wall upper edge comprises a plurality of cutouts configured to support a second portion of the grate.

7. The system of claim 1, further comprising a plurality of air vent holes positioned in at least one of the front wall, the rear wall, the first side wall and the second side wall.

8. The system of claim 1, further comprising an equal plurality of air vent holes positioned in the front wall and the rear wall.

9. The system of claim 8, wherein a number of air vent holes positioned in front wall is at least seven and a number of air vent holes positioned in rear wall is at least seven.

10. The system of claim 1, further comprising a first handle attached to the exterior surface of the first side wall and a second handle attached to the exterior surface of the second side wall.

11. A method for transitioning a collapsible grill from an upright configuration to a collapsed configuration, the collapsible grill comprising a first base portion, a second base portion, a front wall, a rear wall, a first side wall, a second side wall, and a plurality of legs rotatably attached to at least two of the front wall, the rear wall, the first side wall, and the second side wall, the method comprising:

rotating the first base portion about a first horizontal hinge connecting the first base portion to the front wall to position an upper surface of the first base portion to face an interior surface of the front wall;

rotating the second base portion about a second horizontal hinge connecting the second base portion to the rear wall to position an upper surface of the second base portion to face an interior surface of the rear wall; and rotating the front wall, rear wall, first side wall, and second side wall about third vertical hinges connecting the first side wall to the front wall and the rear wall and connecting the second side wall to the front wall and the rear wall to position an interior surface of the first side wall to face a lower surface of the first base portion, to position an interior surface of the second side wall to face a lower surface of the second base portion, and to position a portion of the lower surface of the first base portion to face the lower surface of the second base portion to arrange the collapsible grill in a collapsed configuration.

12. The method of claim 11, further comprising rotating each of the plurality of legs to position an edge corresponding to a length of the respective leg to be substantially parallel to a lower edge of at least one of the front wall, the rear wall, the first side wall, and the second side wall.

13. A collapsible grill system comprising:

a base comprising a first base portion and a second base portion, the first base portion having a first base portion upper surface and a first base portion lower surface, the second base portion having a second base portion upper surface and a second base portion lower surface;

a front wall having a front wall exterior surface and a front wall interior surface the front wall hingedly attached to the first base portion and extending upward from the first base portion upper surface;

a rear wall having a rear wall exterior surface and a rear wall interior surface, the rear wall hingedly attached to the second base portion and extending upward from the second base portion upper surface;

a right side wall having a right side wall exterior surface and a right side wall interior surface, the right side wall hingedly attached to the front wall and hingedly attached to the rear wall, wherein the right side wall comprises a lower portion extending inward from the right side wall interior surface to form a right side wall flange configured to support a portion of the first base portion and the second base portion;

a left side wall having a left side wall exterior surface and a left side wall interior surface, the left side wall hingedly attached to the front wall and hingedly attached to the rear wall, wherein the left side wall comprises a lower portion extending inward from the left side wall interior surface to form a left side wall flange configured to support a portion of the first base portion and the second base portion;

a plurality of legs rotatably attached to the front wall and the rear wall, each leg having a foot configured to engage a surface on which the collapsible grill system is supported; and a plurality of stoppers fixedly attached to the front wall and the rear wall, wherein each of the plurality of legs has a corresponding stopper configured to restrict rotation of the leg to arrange the collapsible grill system in an upright configuration;

wherein, the first base portion is configured to hingedly rotate to position the first base portion upper surface to face the front wall interior surface, the second base portion is configured to hingedly rotate to position the second base portion upper surface to face the rear wall interior surface, and the front wall, rear wall, right side wall, and left side wall are configured to hingedly rotate in cooperation to position the right side wall interior surface to face the first base portion lower surface, to position the left side wall interior surface to face the second base portion lower surface, and to position a portion of the first base portion lower surface to face the second base portion lower surface to arrange the collapsible grill system in a collapsed configuration.

14. The system of claim 13, wherein each of the plurality of legs has a length and a width and each of the plurality of legs is configured to rotate to a position where an edge along the length of the respective leg is substantially parallel to a lower edge of the respective wall to which the leg is attached.

15. The system of claim 13, wherein a first portion of the first base portion lower surface is configured to engage a portion of the upper surface of the right side wall flange and a portion of the upper surface of the left side wall flange in an upright configuration.

16. The system of claim 15, wherein a first portion of the second base portion lower surface is configured to engage a portion of the upper surface of the right side wall flange and a portion of the upper surface of the left side wall flange in the upright configuration.

17. The system of claim 13, wherein the front wall comprises a front wall lower edge adjacent to the hinged attachment of the front wall to the first base portion and a front wall upper edge opposite the front wall lower edge, wherein the front wall upper edge comprises a first plurality of cutouts configured to support a first portion of a grate.

18. The system of claim 17, wherein the rear wall comprises a rear wall lower edge adjacent to the hinged attachment of the rear wall to the second base portion and a rear wall upper edge opposite the rear wall lower edge, wherein the rear wall upper edge comprises a second plurality of cutouts configured to support a second portion of the grate.

19. The system of claim 13, further comprising a plurality of air vent holes positioned in at least one of the front wall, the rear wall, the right side wall and the left side wall.

20. The system of claim 13, further comprising an equal plurality of air vent holes positioned in the front wall and the rear wall.

21. The system of claim 20, wherein a number of air vent holes positioned in the front wall is at least seven and a number of air vent holes positioned in the rear wall is at least seven.

22. The system of claim 13, further comprising a first handle attached to the exterior surface of the right side wall and a second handle attached to the exterior surface of the left side wall.

* * * * *